US007693544B2

(12) United States Patent
Segev et al.

(10) Patent No.: US 7,693,544 B2
(45) Date of Patent: Apr. 6, 2010

(54) SYSTEM, METHOD AND DEVICE OF RECEIVING SIGNALS OF A PLURALITY OF COMMUNICATION SERVICES

(75) Inventors: Eran Segev, Tel Aviv (IL); Daniel Yellin, Ra'anana (IL); Eliav Zipper, Tel Aviv (IL); Avi Brillant, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 11/476,902

(22) Filed: Jun. 29, 2006

(65) Prior Publication Data

US 2008/0003969 A1 Jan. 3, 2008

(51) Int. Cl.
*H04M 1/00* (2006.01)

(52) U.S. Cl. .................. 455/553.1; 455/132; 455/550.1; 455/552.1

(58) Field of Classification Search .............. 455/553.1, 455/132, 550.1, 552.1, 426.1, 127.4, 130, 455/150.1, 562.1, 277.1, 272, 275, 334; 375/200, 375/295, 316, 130
See application file for complete search history.

(56) References Cited

U.S. PATENT DOCUMENTS

| 5,685,308 | A | 11/1997 | Wright et al. | |
|---|---|---|---|---|
| 5,815,525 | A | 9/1998 | Smith et al. | |
| 6,359,940 | B1 * | 3/2002 | Ciccarelli et al. | 375/316 |
| 6,728,525 | B1 * | 4/2004 | Leizerovich et al. | 455/260 |
| 6,885,695 | B1 * | 4/2005 | Coniglione | 375/147 |
| 6,957,081 | B2 * | 10/2005 | Leyh et al. | 455/553.1 |
| 7,133,646 | B1 * | 11/2006 | Miao | 455/73 |
| 7,187,945 | B2 * | 3/2007 | Ranta et al. | 455/552.1 |
| 7,197,291 | B2 * | 3/2007 | Mach et al. | 455/303 |
| 2004/0018853 | A1 * | 1/2004 | Lewis | 455/552.1 |
| 2004/0038652 | A1 * | 2/2004 | Khlat et al. | 455/130 |
| 2006/0084469 | A1 * | 4/2006 | Malone et al. | 455/552.1 |
| 2006/0223487 | A1 * | 10/2006 | Alam et al. | 455/344 |
| 2006/0246942 | A1 * | 11/2006 | Ramachandran et al. | 455/553.1 |
| 2006/0252403 | A1 * | 11/2006 | Garcia | 455/334 |
| 2008/0205535 | A1 * | 8/2008 | Feher | 375/261 |

FOREIGN PATENT DOCUMENTS

JP 2001-094445 4/2001

OTHER PUBLICATIONS

Suzuki et al. "a Novel Multi-Service Simultaneous Reception by Sharing Diversity Branches" IEICE Trans. Commun., vol. E88-B, No. 11, Nov. 11, 2005; p. 4212-4219.

(Continued)

*Primary Examiner*—Pablo N Tran
(74) *Attorney, Agent, or Firm*—Shiloh et al.

(57) ABSTRACT

Embodiments of the present invention provide a system, method, and apparatus of receiving signals of a plurality of communication services. The apparatus may include, for example, a plurality of multimode receivers to receive signals of a plurality of wireless communication services, wherein the number of the plurality of communication services is equal to or greater than the number of the plurality of multimode receivers; and a controller to control a receive mode of the plurality of receivers. Other embodiments are described and claimed.

20 Claims, 2 Drawing Sheets

OTHER PUBLICATIONS

IEEE-Std 802.11a-1999, Higher speed Physical Layer (PHY) extension in the 5 GHz band; The 802.11a standard.

IEEE-Std 802.11b-1999 Supplement to 802.11-1999, Wireless LAN MAC and PHY specifications: Higher Speed Physical Layer (PHY) extension in the 2.4 GHz band; The 802.11b standard.

IEEE-Std 802.11g-2003 Supplement to 802.11-1999, Wireless LAN MAC and PHY specifications: Further Higher Data Rate extension in the 2.4 GHz band, Draft 8.2; The 802.11g standard.

IEEE-Std 802.16, 2004 Edition, Air Interface for Fixed Broadband Wireless Access Systems; The 802.16 Standard.

IEEE-Std 802.16e, 2005 Edition, Physical and Medium Access Control Layers for Combined Fixed and Mobile Operation in Licensed Bands.

International Search Report for International Application No. PCT/US2007/072335. Date of Mailing Nov. 20, 2007.

Written Opinion of the International Searching Authority for International Application No. PCT/US2007/072335. Dated Apr. 2007.

* cited by examiner

US 7,693,544 B2

SYSTEM, METHOD AND DEVICE OF RECEIVING SIGNALS OF A PLURALITY OF COMMUNICATION SERVICES

BACKGROUND OF THE INVENTION

A wireless communication device may be adapted to perform diversity reception of wireless signals of a plurality of communication services, e.g., a Wireless Fidelity (Wi-Fi) communication service and a cellular communications service.

The device may include a plurality of receiver modules to receive signals of the plurality of communication services, respectively. Each of the plurality of receiver modules may include a plurality of receive paths to perform diversity reception of the received signals. Each of the paths may include one or more antennas, a band/mode selector and a receiver adapted to receive signals of one of the plurality of communication services. This configuration may be relatively complex and/or expensive, since a relatively large number of receive paths may be required. For example, a device to receive signals of two communication services may include two receiver modules, each including two receive paths, wherein each receive path includes a receiver and an antenna.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
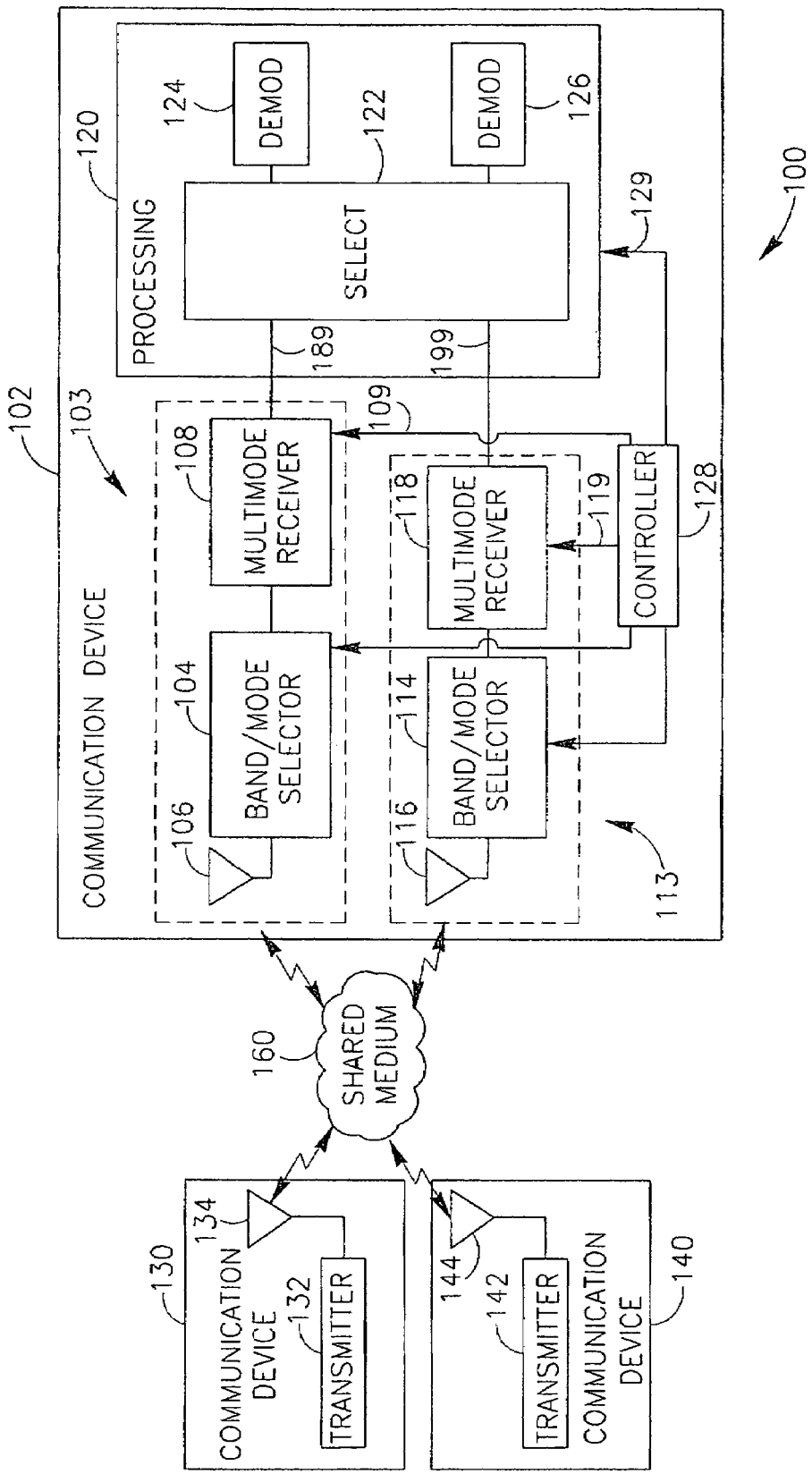
FIG. 1 is a schematic illustration of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of receivers" may include two or more receivers.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) system, a Wireless Metropolitan Area Network (WMAN) communication system, and/or in any other unit and/or device. Units of a communication system intended to be included within the scope of the present invention include, by way of example only, modems, Mobile Units (MU), Access Points (AP), wireless transmitters/receivers, and the like.

Types of WLAN and/or WMAN communication systems intended to be within the scope of the present invention include, although are not limited to, WLAN and/or WMAN communication systems. For example, the communication systems may include communication systems supporting one or more communication services, for example, wireless-fidelity (Wi-Fi) services, e.g., as described by "IEEE-Std 802.11, 1999 Edition (ISO/IEC 8802-11: 1999)" standard ("the 802.11 standard"), and more particularly in "IEEE-Std 802.11a-1999, Higher speed Physical Layer (PHY) extension in the 5 GHz band" standard ("the 802.11a standard"), "IEEE-Std 802.11b-1999 Supplement to 802.11-1999, Wireless LAN MAC and PHY specifications: Higher speed Physical Layer (PHY) extension in the 2.4 GHz band" ("the 802.11b standard"), "IEEE-Std 802.11g-2003 Supplement to 802.11-1999, Wireless LAN MAC and PHY specifications: Further Higher Data Rate Extension in the 2.4 GHz band, Draft 8.2" standard ("the 802.11g standard"), in "IEEE-Std 802.16, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands", and the like; cellular services, e.g., a $3^{rd}$ Generation Partnership Project (3GPP) communication service, such as, for example, a Global System for Mobile communications (GSM) service, a Universal Mobile Telecommunications System (UMTS) service, and the like; and/or any other suitable communication service.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to receiving a wireless communication signal. However, embodiments of the invention are not limited in this regard, and may include, for example, receiving a block, a data portion, a packet, a data sequence, a frame, a data signal, a preamble, a signal field, a content, an item, a message, a protection frame, a transmission or the like.

Reference is made to FIG. 1, which schematically illustrates a wireless communication system 100 in accordance with some demonstrative embodiments of the present invention.

According to some demonstrative embodiments of the invention, communication system 100 may include a wireless communication device 102 to receive signals of a plurality of wireless communication services. For example, device 102 may communicate with one or more communication devices, e.g., communication devices 130 and/or 140, over a shared medium 160. The one or more communication device may include any suitable communication devices to transmit signals of one or more of the plurality of wireless communication services. For example, device 130 may include a transmitter 132 to transmit signals of a first wireless communication service via at least one antenna 134; and/or communication device 140 may include a transmitter 142 to transmit over medium 160 signals of a second wireless communication service via at least one antenna 144. The first and second wireless communications services may include, for example, first and second different communication services. Although the invention is not limited in this respect, signals of at least one of the first and second communication services may include, for example, signals to be received in diversity, e.g., using two or more receivers substantially simultaneously. For example, the first communication service may include a Wi-Fi communication service, e.g., in accordance with the 802.11 standard, the 802.165 standard, and/or any other suitable Wi-Fi standard or protocol; and/or the second communication service may include a cellular communication service, e.g., the GSM communication service, the UMTS communication service, and/or any other suitable cellular communication service.

According to some demonstrative embodiments of the invention, communication device 102 may include a plurality of receive paths, e.g., including receive paths 103 and/or 113, e.g., as are described in detail below.

According to some demonstrative embodiments of the invention, the number of receive paths of device 102 may be equal to or smaller than the number of the plurality of communication services which may be received by communication device 102, e.g., as described in detail below. For example, device 102 may include no more than two receive paths, e.g., paths 103 and 113, if, for example, device 102 is to receive signals of two or more communication services.

According to some demonstrative embodiments of the invention, one or more of the receive paths of device 102 may include at least one antenna, a multimode receiver, and/or a band/mode selector. For example, receive path 103 may include at least one antenna 106, a band/mode selector 104, and a multimode receiver 108; and/or receive path 113 may include at least one antenna 116, a band/mode selector 114, and a multimode receiver 118, as are described in detail below.

Although the invention is not limited in this respect, according to some demonstrative embodiments of the invention, receiver 108 and/or 118 may be implemented, for example, using a transmitter-receiver or transceiver.

Although the scope of the present invention is not limited in this respect, types of antennae that may be used for antennas 134, 144, 106, and/or 116 may include but are not limited to internal antenna, dipole antenna, omni-directional antenna, a monopole antenna, an end fed antenna, a circularly polarized antenna, a micro-strip antenna, a diversity antenna and the like.

According to some demonstrative embodiments of the invention, multimode receivers 108 and 118 may include any suitable multimode receivers, e.g., as are known in the art, to receive signals of a plurality of wireless communication services. Multimode receivers 108 and/or 118 may have, for example, a plurality of receive modes to receive signals of the plurality of communication services.

According to some demonstrative embodiments of the invention, the number of receive modes of the multimode receivers of device 102 may be equal to or greater than the number of the receive paths of device 102. For example, multimode receivers 108 and/or 118 may have, for example, at least two receive modes.

According to some demonstrative embodiments of the invention, multimode receiver 108 may have a first receive mode to receive signals of a first communication service, e.g., the Wi-Fi communication service, and a second receive mode to receive signals of a second communication service, e.g., the cellular communication service; and multimode receiver 118 may have a first receive mode to receive signals of the first communication service, e.g., the Wi-Fi communication service, and a second receive mode to receive signals of the second communication service, e.g., the cellular communication service.

According to some demonstrative embodiments of the invention, band/mode selectors 104 and/or 114 may include any suitable band/mode selector, e.g., as is known in the art. Selector 104 may select, for example, one of a plurality of communication modes corresponding to the receive mode of multimode receiver 108, and/or one of a plurality of communication bands corresponding to the selected communication mode of selector 104; and/or selector 114 may select, for example, one of a plurality of communication modes corresponding to the receive mode of multimode receiver 118, and/or one of a plurality of communication bands corresponding to the selected communication mode of selector 114. For example, selectors 104 and/or 114 may select a first communication mode from a plurality of Wi-Fi communication modes, e.g., including one or more communication modes according to the 802.11 standard, and/or the 802.16 standard; and/or a communication band of a predefined plurality of communication bands corresponding to the first communication mode, if multimode receivers 108 and/or 118 are at the first receive mode. Selectors 104 and/or 114 may select a first communication mode from a plurality of cellular communication modes, e.g., including a GSM communication mode, a General Packet Radio Service (GPRS) communication mode, and/or an Enhanced DPRS (EGPRS) communication mode; and/or a communication band of a predefined plurality of communication bands corresponding to the second communication mode, if multimode receivers 108 and/or 118 are at the second receive mode.

According to some demonstrative embodiments of the invention, device 102 may also include a controller to control the receive mode of receivers 108 and 118, e.g., using control signals 109 and 119, respectively, as described in detail below. Controller 128 may also control selector 104 to select a communication mode and/or communication band corresponding to the receive mode of receiver 108; and/or selector 114 to select a communication mode and/or communication band corresponding to the receive mode of receiver 118.

According to some demonstrative embodiments of the invention, controller 128 may control each of the plurality of multimode receivers of device 102 to operate at a different one of the plurality of receive modes, e.g., when signals of all of the plurality of communication services are to be received by device 102, e.g., substantially simultaneously. For example, controller 128 may control each of receivers 108 and 118 to operate at a different one of the two receive modes, when signals of two communication services are to be received, e.g., substantially simultaneously. Controller 128 may control receiver 108 to operate at one of the first and second receive modes, e.g., the first receive mode, and receiver 118 to operate at another one of the first and second receive modes, e.g., the second receive mode, if for example, signals of both communication services are to be received, e.g., substantially simultaneously. Accordingly, receiver 108 may receive signals of the first communication service, e.g., Wi-Fi signals, and receiver 118 may receive signals of the second communication service, e.g., cellular signals. For example, controller 128 may control receivers 108 and 118, such that device 102 may receive, substantially simultaneously, cellular signals, e.g., as part of a voice communication between a user of device 102 and a user of device 130; and Wi-Fi signals, e.g., as part of a wireless data communication between device 102 and device 140.

According to some demonstrative embodiments of the invention, when signals of less than all of the plurality of communication services are to be received controller 128 may selectively control the multimode receivers such that, for example, two or more of the multimode receivers operate at the same receive mode, e.g. to perform a diversity reception of the signals of one of the communication services; and/or two or more of the multimode receivers operate at different receive modes, e.g., as described below.

According to one demonstrative embodiment of the invention, controller 128 may control both receivers 108 and 118 to operate in diversity, e.g., when signals of only one of the two communication services are to be received. For example, controller 128 may control both receivers 108 and 118 to operate at the first receive mode to receive, e.g., substantially simultaneously, signals of the first communication service, which may be transmitted, for example, by devices 130 and/or 140. Controller 128 may control both receivers 108 and 118 to operate at the second receive mode to receive, e.g., substantially simultaneously, signals of the second communication service, which may be transmitted, for example, by devices 130 and/or 140.

According to another demonstrative embodiment of the invention, when signals of only one of the two communication services are to be received, controller 128 may control receivers 108 and 118, such that only one of receivers 108 and 118 receives the signals, e.g., without diversity. For example, controller 128 may control only one of receivers 108 and 118 to operate at the first receive mode, e.g., to receive signals of the first communication service, which may be transmitted, for example, by devices 130 and/or 140. Controller 128 may control only one of receivers 108 and 118 to operate at the second receive mode, e.g., to receive signals of the second communication service, which may be transmitted, for example, by devices 130 and/or 140.

According to some demonstrative embodiments of the invention, when signals of only one communication service are to be received, controller 128 may select whether to operate both receivers 108 and 118 in diversity, or to operate only one of receivers 108 and 118, based on any suitable criterion. The criterion may include, for example, a criterion related to a Signal to Noise Ration (SNR) value of receivers 108 and/or 118, a power consumption of receivers 108 and/or 118, and/or any other suitable parameter.

Some demonstrative embodiments of the invention are described in relation to a communication device, e.g., device 102, adapted to receive signals of two communication services, wherein the communication device includes two multimode receivers, e.g., receivers 108 and 118, as described above. However, it will be appreciated by persons of ordinary skill in the art, that other embodiments of the invention may include a communication device having a plurality of multimode receivers, e.g., more than two multimode receivers, to receive signals of a plurality of communication services, e.g., more than two communication services, wherein the number of the plurality of communication services is equal to ore greater than the number of the plurality of multimode receivers. For example, according to one demonstrative embodiment of the invention, the communication device may include three multimode receivers to receive signals of three or more communication services One or more of the three multimode receivers, e.g., each one of the three multimode receivers, may have for example, three receive modes to receive signals of the three communication services, respectively. According to this demonstrative embodiment, the communication device may also include a controller to control the receive mode of the plurality of multimode receivers, e.g., analogously to the operation of controller 128. For example, the controller may control each one of the three multimode receivers to operate at a different one of the three receive modes, when signals of all of the three communication services are to be received, e.g., simultaneously. The controller may also control two or more of the three multimode receivers to operate in diversity, and/or two or more of the three multimode receivers to operate at different receive modes e.g., when signals of less than the three communication services are to be received. For example, if signals of only first and second communication services of the three communication services are to be received, then the controller may control two of the three multimode receivers to operate at a first of the three receive modes to receive, in diversity, signals of the first communication service; and a third of the multimode receivers to operate at a second of the three receive modes to receive signals of the second communication service Alternatively, the controller may control only the first and second multimode receivers to operate at the first and second receive modes, respectively, to receive, without diversity, the signals of the first and second communication services, respectively.

According to some demonstrative embodiments of the invention, device 102 may also include a processing module 120 to process the signals received by multimode receivers 108 and/or 118.

Although the invention is not limited in this respect, according to some demonstrative embodiments of the invention, processing module 120 may include a selector 122, and a plurality of demodulators, e.g., demodulators 124 and 126, to demodulate signals of the plurality of communication services, respectively. Demodulator 124 may be adapted, for example, to demodulate signals of the first communication service. For example, demodulator 124 may include a Wi-Fi demodulator, e.g., in accordance with the 802.11 and/or 802.16 standards. Demodulator 126 may be adapted, for example, to demodulate signals of the second communication service. For example, demodulator 126 may include a cellular demodulator, e.g., a GSM demodulator, as is known in the art.

According to some demonstrative embodiments of the invention, controller 128 may control processing module 120, e.g., using control signals 129, to process the signals received by multimode receiver 108 and/or 118. For example, controller 128 may control selector 122 to selectively transfer signals 189 from receiver 108 to demodulator 124, and signals 199 from receiver 118 to demodulator 126, e.g., if signals 189 and 199 include signals of the first and second communication services respectively, for example, when receivers 108 and 118 are at the first and second receive modes, respectively. Controller 128 may control selector 122 to selectively transfer both signals 189 and 199 to demodulator 124, e.g., if both receivers 108 and 118 are set to the first receive mode to receive signals of the first communication service, in diversity. Controller 128 may control selector 122 to selectively transfer both signals 189 and 199 to demodulator 126, e.g., if both receivers 108 and 118 are set to the second receive mode to receive signals of the second communication service, in diversity. Controller 128 may control selector 122 to selectively transfer only one of signals 189 and 199 to demodulator 124, e.g., if only a respective one of receivers 108 and 118 is set to the first receive mode to receive signals of the first communication service. Controller 128 may control selector 122 to selectively transfer only one of signals 189 and 199 to demodulator 126, e.g., if only a respective one of receivers 108 and 118 is set to the second receive mode to receive signals of the second communication service. It will be appreciated by those of ordinary skill in the art that processing module 120 may include any other suitable processing module, configuration and/or arrangement.

Figure 2:
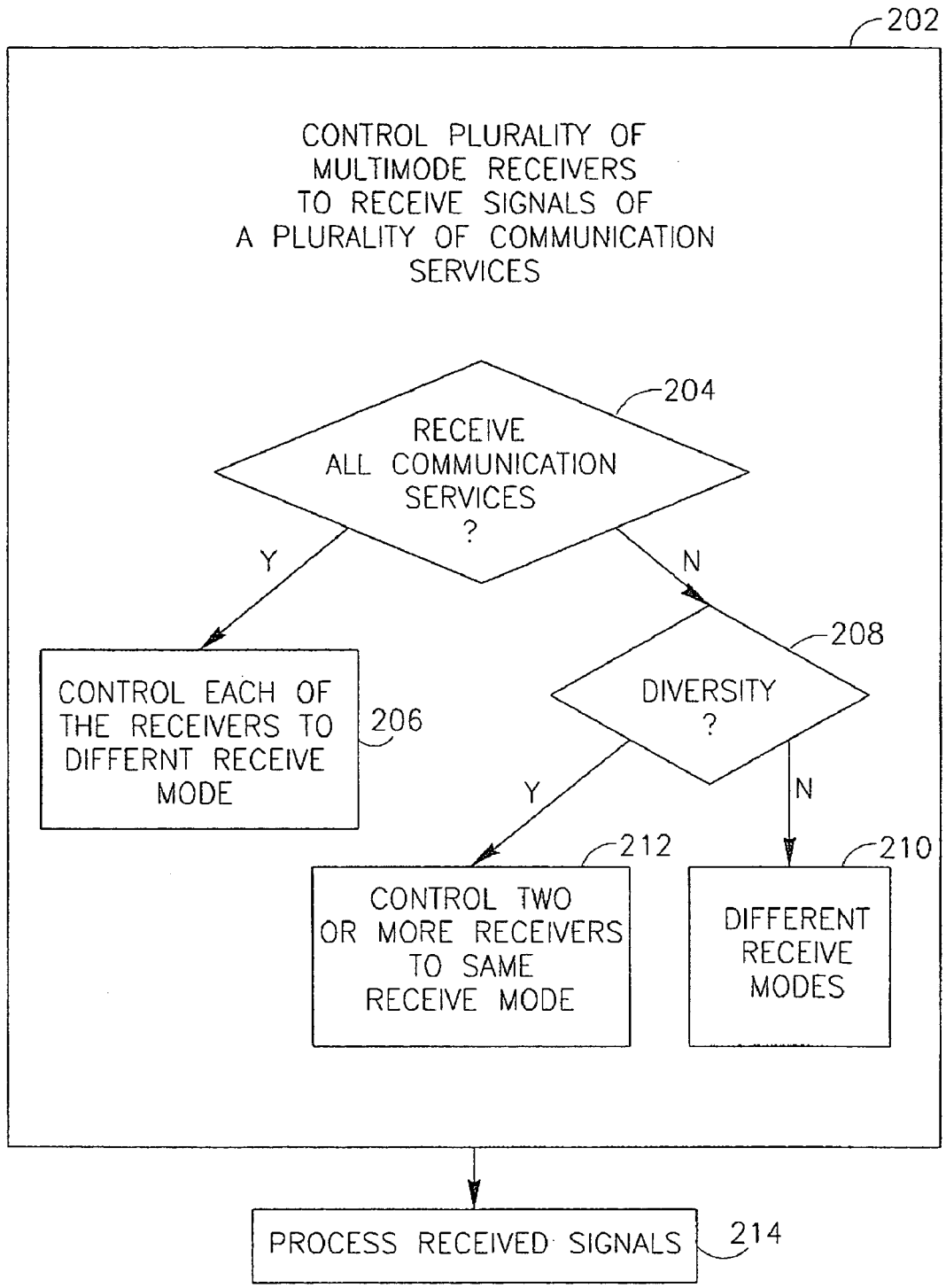
FIG. 2 is a schematic flow-chart illustration of a method of receiving signals of a plurality of communication services in accordance with some demonstrative embodiments of the invention.

Reference is now made to FIG. 2, which schematically illustrates a method of receiving signals of a plurality of communication services in accordance with some demonstrative embodiments of the invention. Although the invention is not limited in this respect, one or more operations of the method of FIG. 2 may be implemented by system 100 (FIG. 1), device 102 (FIG. 1), controller 128 (FIG. 1), multimode receiver 108 (FIG. 1), multimode receiver 118 (FIG. 1), and/or processing module 120 (FIG. 1), for example, to receive and/or process signals of a plurality of communication services, e.g., transmitted by device 130 and/or device 140 (FIG. 1).

As indicated at block 202, the method may include, for example, controlling a receive mode of a plurality of multimode receivers to receive signals of a plurality of wireless communication services, wherein the number of the plurality of communication services is equal to or greater than the number of the plurality of multimode receivers. For example, controller 128 (FIG. 1) may control multimode receivers 108 and/or 118 (FIG. 1), e.g., as described above.

As indicated at block 204, the method may include selectively controlling the receive mode of the plurality of multimode receivers, e.g., based on the number of communication services to be received. For example, controller 128 (FIG. 1) may control multimode receivers 108 and/or 118 (FIG. 1) based on the number of the communication services to be received, e.g., as described above.

As indicated at block 206, the method may include controlling each of the multimode receivers to operate at a different receive mode, e.g., when signals of all of the plurality of communication services are to be received. For example, controller 128 (FIG. 1) may control each of multimode receivers 108 and/or 118 (FIG. 1) to operate at different one the first and second receive modes. e.g., as described above.

As indicated at block 208, the method may include selectively controlling the receive mode of the plurality of multimode receivers, e.g., based on whether or not signals of one or more of the plurality of communication services are to be received in diversity, if for example, signals of less than all of the plurality of communication services are to be received. For example, controller 128 (FIG. 1) may control multimode receivers 108 and/or 118 (FIG. 1) based on whether or not the signals of the first or second communication service are to be received in diversity, e.g., as described above.

As indicated at block 212, the method may include controlling two or more of the plurality of multimode receivers to operate at the same receive mode, e.g., if signals of at least one of the plurality of communications services are to be received in diversity. For example, controller 128 (FIG. 1) may control both multimode receivers 108 and/or 118 (FIG. 1) to receive signals of the same communication service in diversity, e.g., as described above.

As indicated at block 210, the method may include controlling less than all of the plurality of multimode receivers to receive signals of the plurality of communication services to be received, respectively. For example, controller 128 (FIG. 1) may control only one of multimode receivers 108 and/or 118 (FIG. 1) to receive signals of one of the first and second communication service, e.g., as described above.

As indicated at block 214, the method may also include processing the received signals. For example, controller 128 (FIG. 1) may control processing module 120 (FIG. 1) to process the received signals, e.g., as described above.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
a plurality of multimode receivers to receive signals of a plurality of wireless communication services, wherein the plurality of wireless communication services include at least a wireless-local-area-network (WLAN) communication service and a cellular communication service, wherein the signals of at least one of said communication services include signals to be received in diversity by two or more receivers, wherein the number of said plurality of communication services is equal to or greater than the number of said plurality of multimode receivers, wherein each of said multimode receivers has a plurality of receive modes, and wherein each one of said receive modes is adapted to receive signals of a respective one of said plurality of communication services; and
a controller to control the receive modes of said plurality of receivers, wherein, when signals of less than all of said plurality of communication services are to be received, the controller is to control two or more multimode receivers of the multimode receivers to operate in diversity such that the two or more multimode receivers receive, substantially simultaneously, signals of a common wireless communication service.

2. The apparatus of claim 1, wherein the signals of each of said plurality of services comprise signals to be received in diversity by two or more receivers.

3. The apparatus of claim 1, wherein said controller controls each of said multimode receivers to operate at a different one of said plurality of receive modes, when signals of all of said plurality of communication services are to be received, such that each of the plurality of multimode receivers receives signals of a different one of the plurality of communication services.

4. The apparatus of claim 1, wherein at least one of said WLAN communication service and said cellular communication service includes a wireless-fidelity (WiFi) communication service and a global system for mobile (GSM) communication service, respectively.

5. The apparatus of claim 1, wherein said controller controls less than all of said plurality of multimode receivers to receive signals of said less than all of said plurality of communication services, respectively, when signals of less than all of said plurality of communication services are to be received.

6. The apparatus of claim 1, wherein said plurality of multimode receivers comprises first and second multimode receivers, each having first and second modes of operation to receive signals of WLAN and cellular communication services, respectively.

7. The apparatus of claim 6, wherein when signals of only one of said WLAN and cellular communication services are to be received, said controller controls at least one of said first and second multimode receivers to receive the signals of the one communication service.

8. The apparatus of claim 6, wherein said controller controls both said first and second multimode receivers to operate in diversity to receive, substantially simultaneously, the signals of the one communication service.

9. The apparatus of claim 1, wherein when signals of said WLAN and cellular communication services are to be received simultaneously, said controller controls said first multimode receiver to receive the signals of said WLAN communication service and said second multimode receiver to receive the signals of said cellular communication service.

10. A method comprising:
controlling a receive mode of a plurality of multimode receivers to receive signals of a plurality of wireless communication services, wherein the plurality of wireless communication services include at least a wireless-local-area-network (WLAN) communication service and a cellular communication service, wherein the signals of at least one of said communication services include signals to be received in diversity by two or more receivers, wherein the number of said plurality of communication services is equal to or greater than the number of said plurality of multimode receivers,
wherein each of said multimode receivers has a plurality of receive modes, and wherein each one of said receive modes is adapted to receive signals of a respective one of said plurality of communication services,
and wherein said controlling comprises:
when signals of less than all of said plurality of communication services are to be received, controlling two or more multimode receivers of said multimode receivers to operate in diversity such that the two or more multimode receivers receive, substantially simultaneously, signals of a common wireless communication service.

11. The method of claim 10, wherein said controlling comprises controlling each of said multimode receivers to operate at a different receive mode, when signals of all of said plurality of communication services are to be received, such that each of the plurality of multimode receivers receives signals of a different one of the plurality of communication services.

12. The method of claim 10, wherein said controlling comprises controlling less than all of said plurality of multimode receivers to receive signals of said less than all of said plurality of communication services, respectively, when signals of less than all of said plurality of communication services are to be received.

13. The method of claim 10, wherein controlling said plurality of multimode receivers comprises controlling first and second multimode receivers, each having first and second modes of operation to receive signals of the WLAN and cellular communication services, respectively.

14. The method of claim 13, wherein when signals of said WLAN and cellular communication services are to be received simultaneously, said controlling comprises controlling said first multimode receiver to receive the signals of said WLAN communication service and said second multimode receiver to receive the signals of said cellular communication service.

15. The method of claim 14, wherein said controlling comprises:
when signals of only one of said WLAN and cellular communication services are to be received, controlling at least one of said first and second multimode receivers to receive the signals of the one communication service.

16. The method of claim 15, wherein said controlling comprises controlling both said first and second multimode receivers to operate in diversity to receive, substantially simultaneously, the signals of the one communication service.

17. A system comprising:
a wireless communication device comprising:
- a plurality of multimode receivers to receive signals of a plurality of wireless communication services, wherein the plurality of wireless communication services include at least a wireless-local-area-network (WLAN) communication service and a cellular communication service, wherein the signals of at least one of said communication services include signals to be received in diversity by two or more receivers, wherein the number of said plurality of communication services is equal to or greater than the number of said plurality of multimode receivers, wherein each of said multimode receivers has a plurality of receive modes, and wherein each one of said receive modes is adapted to receive signals of a respective one of said plurality of communication services; and
- a controller to control the receive modes of said plurality of receivers, wherein, when signals of less than all of said plurality of communication services are to be received, the controller is to control two or more multimode receivers of the multimode receivers to operate in diversity such that the two or more multimode receivers receive, substantially simultaneously, signals of a common wireless communication service; and
- a plurality of antennas associated with said plurality of receivers.

18. The system of claim 17 comprising at least one other communication device to transmit signals of at least one communication service of said plurality of communication services.

19. The system of claim 17, wherein said plurality of multimode receivers comprises first and second multimode receivers, each having first and second modes of operation to receive signals of the WLAN and cellular communication services, respectively.

20. The system of claim 19, wherein when signals of said WLAN and cellular communication services are to be received simultaneously, said controller controls said first multimode receiver to receive the signals of said WLAN communication service and said second multimode receiver to receive the signals of said cellular communication service, and wherein, when signals of only one of said WLAN and cellular communication services are to be received, the controller is to control both said first and second multimode receivers to operate in diversity to receive, substantially simultaneously, the signals of the one communication service.

* * * * *

UNITED STATES PATENT AND TRADEMARK OFFICE
CERTIFICATE OF CORRECTION

PATENT NO. : 7,693,544 B2 Page 1 of 1
APPLICATION NO. : 11/476902
DATED : April 6, 2010
INVENTOR(S) : Eran Segev et al.

It is certified that error appears in the above-identified patent and that said Letters Patent is hereby corrected as shown below:

In column 9, line 57, in Claim 6, delete "WLAN" and insert -- the WLAN --, therefor.

Signed and Sealed this

Eighth Day of June, 2010

David J. Kappos
*Director of the United States Patent and Trademark Office*